(12) United States Patent
Kurokawa et al.

(10) Patent No.: US 10,803,035 B2
(45) Date of Patent: Oct. 13, 2020

(54) STORAGE DEVICE, COMPUTER SYSTEM, AND CONTROL METHOD FOR STORAGE DEVICE

(71) Applicant: Hitachi, Ltd., Chiyoda-ku, Tokyo (JP)

(72) Inventors: Yoshiki Kurokawa, Tokyo (JP); Satoru Watanabe, Tokyo (JP); Yoshitaka Tsujimoto, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 897 days.

(21) Appl. No.: 15/508,019

(22) PCT Filed: Mar. 27, 2015

(86) PCT No.: PCT/JP2015/059692
§ 371 (c)(1),
(2) Date: Mar. 1, 2017

(87) PCT Pub. No.: WO2016/157310
PCT Pub. Date: Oct. 6, 2016

(65) Prior Publication Data
US 2017/0293644 A1    Oct. 12, 2017

(51) Int. Cl.
*G06F 16/22*    (2019.01)
*G06F 16/21*    (2019.01)
(Continued)

(52) U.S. Cl.
CPC ............ *G06F 16/221* (2019.01); *G06F 16/21* (2019.01); *G06F 16/23* (2019.01);
(Continued)

(58) Field of Classification Search
CPC ............... G06F 9/44536; G06F 16/221; G06F 16/2237; G06F 16/2455; G06F 16/244;
(Continued)

(56) References Cited

U.S. PATENT DOCUMENTS

| | | |
|---|---|---|
| 6,999,967 B1* | 2/2006 | Ghazal ............... G06F 16/2456 |
| 9,110,947 B1* | 8/2015 | Watzke ................ G06F 16/221 |

(Continued)

FOREIGN PATENT DOCUMENTS

| | | |
|---|---|---|
| JP | 5-174063 A | 7/1993 |
| JP | 6-83869 A | 3/1994 |
| JP | 2001-282842 A | 10/2001 |

OTHER PUBLICATIONS

International Search Report (PCT/ISA/210) issued in PCT Application No. PCT/JP2015/059692 dated Jun. 30, 2015 with English translation (Four (4) pages).

(Continued)

*Primary Examiner* — Shyue Jiunn Hwa
(74) *Attorney, Agent, or Firm* — Crowell & Moring LLP

(57) ABSTRACT

A storage device for storing a column store database, the storage device comprising: a column read unit which reads page data to be searched that have been read from the column store database, acquires a leading row number included in the page data, and reads each column of data in the page data, sequentially from the leading row number to the last row in the column of data; a data search unit which compares each row in each read column of data with first search criteria, from the first row to the last row, and outputs a comparison result; and a search result aggregation unit which, when a comparison result for a range of columns specified by a search request has been output, compares each row in the comparison result with second search criteria, and determines one or more rows in the comparison result that satisfy the second search criteria.

15 Claims, 12 Drawing Sheets

(51) Int. Cl.
*G06F 16/23* (2019.01)
*G06F 16/28* (2019.01)
*G06F 16/2453* (2019.01)
*G06F 16/2455* (2019.01)

(52) U.S. Cl.
CPC .. *G06F 16/24542* (2019.01); *G06F 16/24561* (2019.01); *G06F 16/28* (2019.01)

(58) Field of Classification Search
CPC ........... G06F 16/2453; G06F 16/24556; G06F 16/24561; G06F 16/24575; G06F 16/24578; G06F 16/2462; G06F 16/2465; G06F 16/248; G06F 16/25; G06F 16/9535; G06F 40/242; G06F 16/2365; G06F 16/24554; G06F 16/284; G06F 16/245; G06F 16/22; G06F 16/285; G06F 16/23; G06F 40/205; G06F 16/2477; G06F 16/273; G06F 40/186; G06F 16/252; G06F 16/214; G06F 16/217; G06F 16/2246; G06F 16/24549
See application file for complete search history.

(56) References Cited

U.S. PATENT DOCUMENTS

| | | | |
|---|---|---|---|
| 9,870,399 B1* | 1/2018 | Sinclair | G06F 16/24552 |
| 2011/0246432 A1 | 10/2011 | Yang et al. | |
| 2013/0262370 A1 | 10/2013 | Diner et al. | |
| 2016/0275150 A1* | 9/2016 | Bournonnais | G06F 16/24575 |

OTHER PUBLICATIONS

Japanese-language Written Opinion (PCT/ISA/237) issued in PCT Application No. PCT/JP2015/059692 dated Jun. 30, 2015 (Three (3) pages).

* cited by examiner

| 301 | 302 |
|---|---|
| COMPRESSION CODE | REPRESENTATIVE VALUE |
| COMPRESSION CODE 1 | REPRESENTATIVE VALUE 1 |
| COMPRESSION CODE 2 | REPRESENTATIVE VALUE 2 |
| . . . | . . . |
| COMPRESSION CODE K | REPRESENTATIVE VALUE K |

205 REPRESENTATIVE BUFFER

| COLUMN NUMBER | COMPARISON VALUE | COMPARISON CONDITION |
|---|---|---|
| COLUMN NUMBER 1 | COMPARISON VALUE 1 | COMPARISON CONDITION 1 ≧ |
| COLUMN NUMBER 2 | COMPARISON VALUE 2 | COMPARISON CONDITION 2 < |
| ⋮ | ⋮ | ⋮ |
| COLUMN NUMBER n | COMPARISON VALUE j | COMPARISON CONDITION n = |

801 LOGICAL CONDITION TABLE

| CONDITION | ITEM 1 | ITEM 2 | ... | ITEM p |
|---|---|---|---|---|
| CONDITION 1 | ITEM 1 VALID BIT | ITEM 2 VALID BIT | ... | ITEM p VALID BIT |
| CONDITION 2 | ITEM 1 VALID BIT | ITEM 2 VALID BIT | ... | ITEM p VALID BIT |
| ⋮ | ⋮ | ⋮ | ⋮ | ⋮ |
| CONDITION o | ITEM 1 VALID BIT | ITEM 2 VALID BIT | ... | ITEM p VALID BIT |

STORAGE DEVICE, COMPUTER SYSTEM, AND CONTROL METHOD FOR STORAGE DEVICE

BACKGROUND

The present invention relates to a computer including an accelerator that is capable of performing database processing.

In the field of storage devices, SSD (solid state drive) and the like using a semiconductor non-volatile storage element such as a flash memory are increasingly becoming popular, replacing HDD (hard disc drive). The storage device using a semiconductor non-volatile storage element has a much higher I/O capability than that of HDD. Due to this drastic improvement in I/O capability, some servers using SSD and the like experienced an excessive load in processing all database with the server processor.

In the database processing, in order to speed up the process, a column-oriented (column store) database is more widely used than before, replacing the row-oriented database.

Patent Document 1 discloses a configuration in which another piece of hardware is added for the database processing to take a burden off of the processor of a computer. Patent Document 1 also discloses a technique to off-load the process for the column store database to specialized hardware from the processor of the computer.

PRIOR ARTS

Patent Documents

Patent Document 1: US Patent Application Laid-open Publication No 2011-0246432

SUMMARY

In the conventional configuration, the following issues occur when the process of the column store database is off-loaded to the specialized hardware.

In the conventional row-oriented database, data of one row is saved in adjacent to each other, and therefore, in a search process, the match determination on the search condition of one row can be performed by reading data in the adjacent records.

On the other hand, in the column store database, the data of one row necessary for the match determination on the search condition is not present in the adjacent records, and in order to calculate the search results, it is necessary to obtain a plurality of pieces of column data and conduct the match determination on the search condition, which requires random access. As a result, this process becomes a bottle neck for the processing capability.

The present invention was made in view of this problem, and an object thereof is to avoid random access in performing search through the column store database and to improve the search process capability.

A representative aspect of the present disclosure is as follows. A storage device that stores therein column-oriented database, comprising: a non-volatile semiconductor storage part configured to store the column-oriented database; a storage controller configured to control data-reading and data-writing of the non-volatile semiconductor storage part; a search part configured to conduct a search process on the column-oriented database; and a control processor configured to receive a search request and control the storage controller and the search part, wherein the control processor requests search target data included in the search request from the storage controller, obtains a first search condition and a second search condition included in the search request, and provides the first and second search conditions to the search part, thereby causing the search part to conduct a search process on the search target data, and wherein the search part comprises: a column read-out part configured to read out page data of the column-oriented database to be subjected to a search process, the column-oriented database being read out by the storage controller, obtain a first row number of the page data, and read out column data for each column stored in the page data successively from the first row number to a last row number, a data search part configured to compare the first search condition with the first row to the last row of the column data read out for each column, and output a comparison result; and a search result aggregation part configured to compare, after a comparison result for each column in an area specified by the search request is output, the comparison result with the second search condition in a row direction, and identify a row that meets the second search condition based on the comparison result.

Thus, with the present invention, it is possible to eliminate random access for the storage device in performing search on the column-oriented databased, and as a result, the process capability can be improved.

DETAILED DESCRIPTION OF THE PREFERRED EMBODIMENTS

Below, embodiments of the present invention will be explained with reference to appended figures.
Embodiment 1

Figure 1:
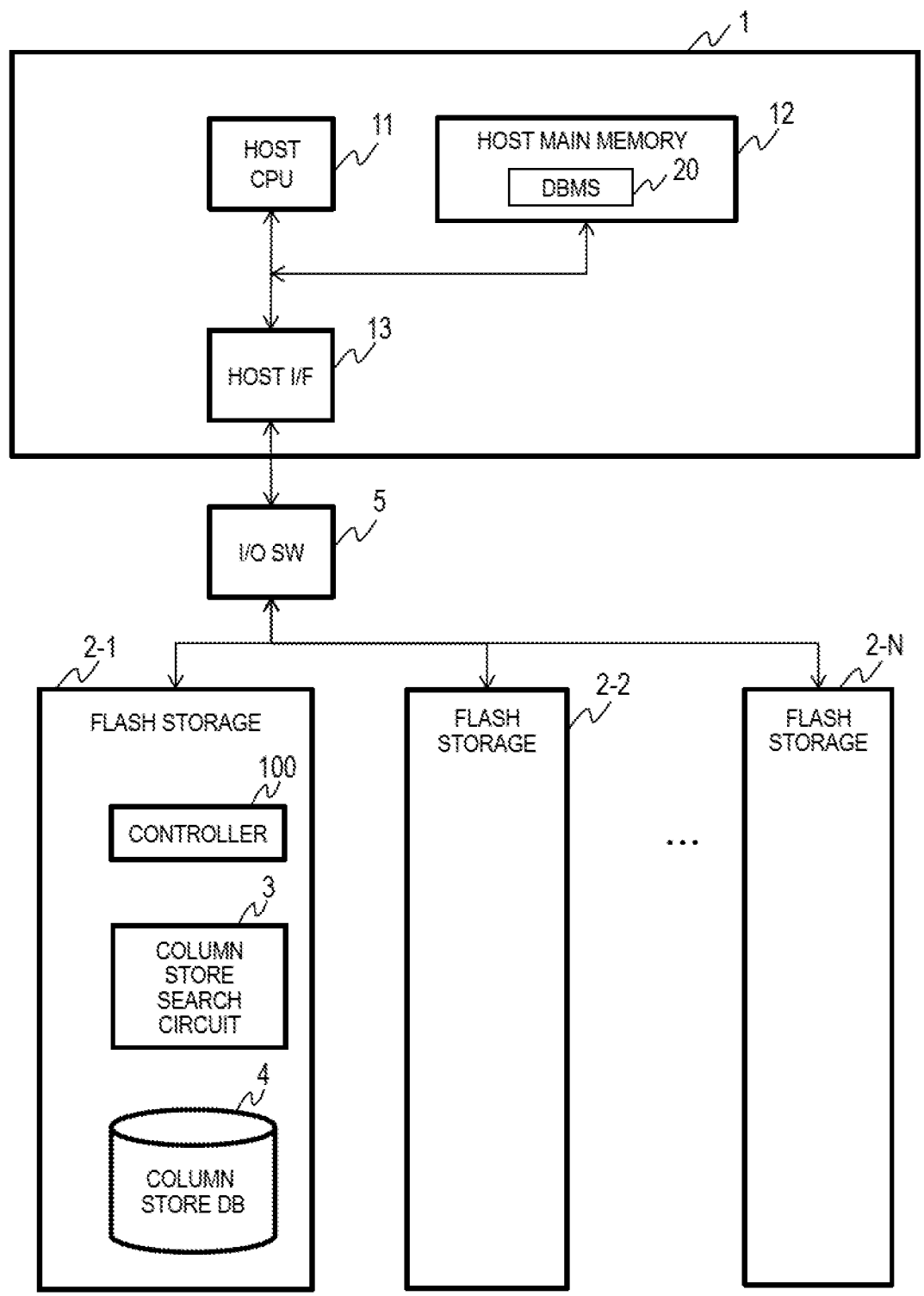
FIG. 1 is a block diagram showing an example of a computer system that includes a storage device equipped with a database assist function according to a first embodiment of this invention.

FIG. 1 is a block diagram showing an example of a computer system that includes a storage device equipped with a database assist function of Embodiment 1 of the present invention.

In the computer system of FIG. 1, a computer 1 is connected to a plurality of flash storages 2-1 to 2-N as storage devices, and each flash storage 2-1 to 2-N includes a column store search circuit as the database assist function, for example. In the descriptions below, the reference character "2" without hyphen is used to describe all of the flash storages collectively, and the reference character "2-" followed by a suffix is used to describe each of the flash storages separately. The same applies to other composition elements. The quantity of the flash storage 2 may be any number as long as it is at least one, and does not necessarily have to be plural.

The computer 1 includes a host CPU 11 performing a computing process, a host main memory 12 storing programs and data, and a host interface (host I/F in the figure) connected to the flash storage 2 via an I/O switch 5.

The host interface 13 may be comprised of PCI express (PCIe), for example. In this case, the I/O switch 5 is a PCI express switch.

The flash storage 2-1 includes at least one flash memory, a column store search circuit 3 that is capable of performing a search process on the column store (column-oriented) database, and a controller including a control CPU, flash controller, and the like. The flash memory stores therein a column store database (will be referred to as a column store DB) 4. The respective flash storages 2-2 to 2-N have the same configuration, and therefore, the configuration thereof is not shown in the figure.

A database management system (will be referred to as DBMS, below) 20 that manages the column store DB 4 stored in the flash storage 2 is loaded to the host main memory 12, and is performed by the host CPU 11.

The respective function parts of the DBMS 20 are loaded to the host main memory 12 as programs. The host CPU 11 operates in accordance with a program of each function part, thereby operating as a function part that realizes a prescribed function. For example, by operating in accordance with the database management program, the host CPU 11 functions as the DBMS 20. The host CPU 11 also operates as a function part that realizes each function of a plurality of processes conducted by respective programs. The computer and computing system are a device and system that include those function parts.

Information for realizing the respective functions of the DBMS 20 such as database management programs and tables can be stored in a storage sub-system such as the flash storage 2, a memory device such as a non-volatile semiconductor memory, hard disk drive, or SSD (solid state drive), or a computer readable non-temporary data storage medium such an IC card, SD card, or DVD.

The DBMS 20 stores therein a correspondence relationship between the column store DB 4 arranged dispersedly across the flash storages 2-1 to 2-N, and the identifiers for the flash storage 2. The DBMS 20 receives an access request such as a search request and update request from a client that is not shown in the figure.

The DBMS 20 identifies a flash storage 2-1 to 2-N that stores therein the data to be subjected to the process in accordance with the access request received from the client, and issues an access request such as a search request to the identified flash storage 2. The dispersal arrangement of database such as the column store DB 4 can be realized by applying a known technology, and is not described in detail here.

Figure 2:
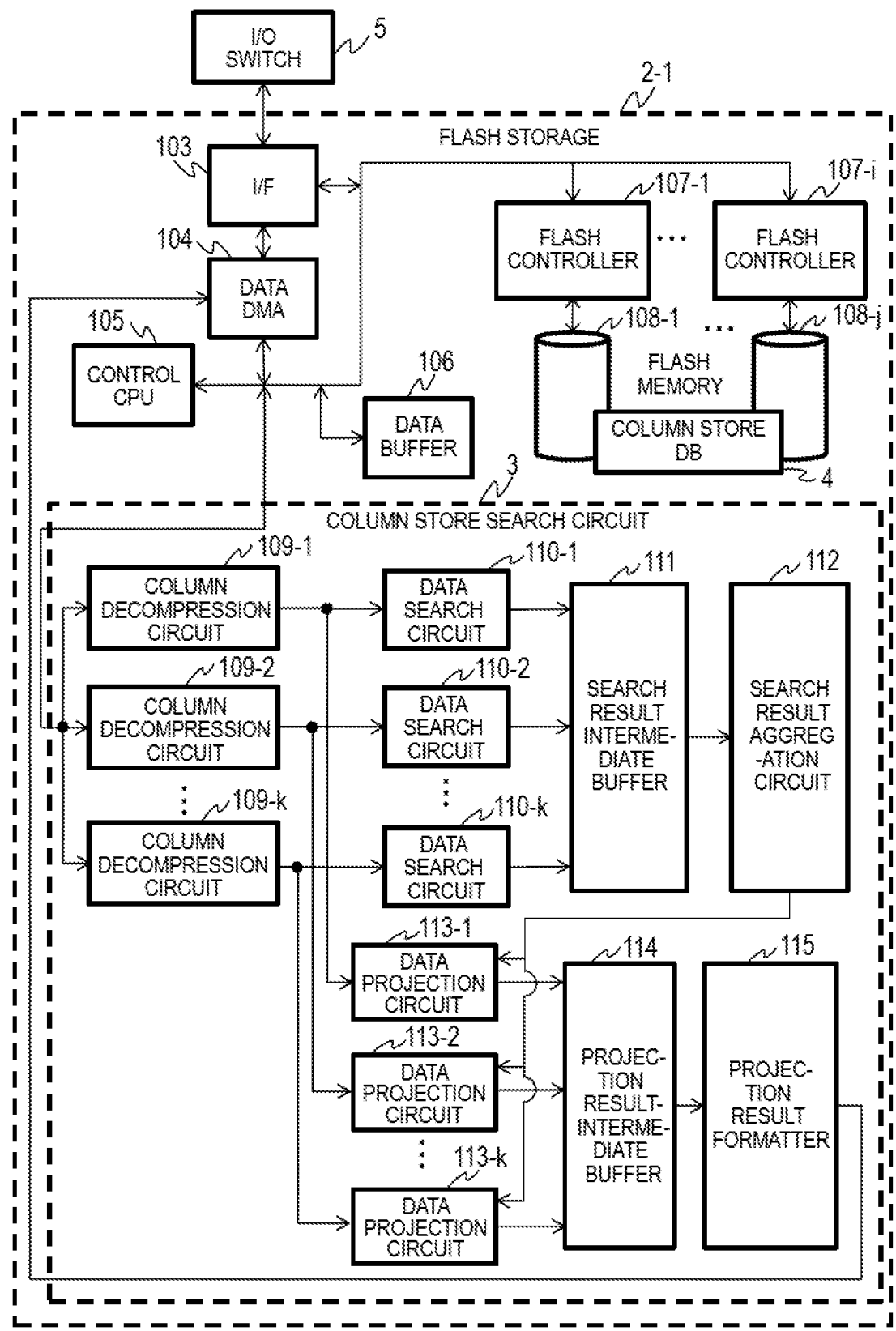
FIG. 2 is a block diagram showing an example of the configuration of the flash storage according to the first embodiment of this invention.

FIG. 2 is a block diagram showing an example of the configuration of the flash storage 2-1. The other flash storages 2-2 to 2-N of FIG. 1 have the same configuration, and therefore, overlapping descriptions will be omitted.

The flash storage 2-1 (will be denoted with 2 below) includes a plurality of flash memories 108-1 to 108-$j$ that store the column store DB 4, flash controllers (storage controllers) 107-1 to 107-$j$ each controlling the flash memory 108, an interface 103 connected to the I/O switch 5, a data DMA 104 made of a DMA controller that exchanges data with the computer 1, a control CPU 105 that controls the flash storage 2, a data buffer 106 that temporarily stores data and commands, and a column store search circuit 3 as hardware (or accelerator) that performs a search process on the column store DB 4.

The interface 103, the data DMA 104, the control CPU 105, the data buffer 106, and the flash controller 107 comprise the controller 100 of the flash storage 2 shown in FIG. 1.

The interface 103 can transfer received data and command, which is not DMA, to the control CPU 105 or data buffer 106. The data DMA 104 receives the search results converted to the row-oriented data from the column store search circuit 3, and writes in the search results in a prescribed address in the host main memory 12 via the interface 103 and the I/O switch 5.

The control CPU 105 executes a prescribed program, and controls the flash controller 107 to read from or write in the flash memory 108. The control CPU 105 also activates the data DMA 104, manages the data buffer 106, and controls the column store search circuit 3.

For example, when receiving a search request from the computer 1, the control CPU 105 sends a command to the flash controller 107 to read out data corresponding to the data area specified by the search request. The flash controller 107 reads out the data of the column store DB 4 from the flash memory 108, and stores the data in the data buffer 106 as page data.

After the data is read from the column store DB 4, the control CPU 105 causes the column store search circuit 3 to conduct the search result described below.

The data buffer 106 functions as a memory buffer that temporarily stores the page data when the flash controller 107 reads from or writes in the flash memory 108, and is also used to temporarily store column data and the like used in the data search circuit 110 described below.

The flash controller 107 controls reading and writing of the flash memory 108 in accordance with the commands from the control CPU 105. The flash controller 107 writes data in the flash memory 108 per block, and reads data out from the flash memory 108 per page.

When writing data in the flash memory 108, the flash controller 107 writes the write-in data, which is temporarily stored in the data buffer 106, in the flash memory 108. When reading data from the flash memory 108, the flash controller 107 reads data out from the flash memory 108, and stores the data in the data buffer 106.

The plurality of flash memories 108 have stored therein the column store DB 4. In the column store DB 4, the compressed column data is stored as described below.

The column store search circuit 3 decompresses the data of the column store DB 4 read out from the flash memory 108 by the flash controller 107 based on the search request, executes the requested search for each column, and outputs the search result to the data DMA 104.

The column store search circuit 3 includes column decompression circuits 109-1 to 109-$k$ that decompress the compressed data in the column store DB 4 and restore column data per column, data search circuits 110-1 to 110-$k$ that search for column data for each column based on the first search condition included in the search request, a search result intermediate buffer 111 that stores search results for each column output from the data search circuit 110, a search result aggregation circuit 112 that extracts a search result for each column that matches the second search condition included in the search request and sums up the final search result (final comparison result), data projection circuits 113-1 to 113-$k$ that pair the final comparison result with the column data and extract the column data of the final search result for each row, a projection result intermediate buffer 114 that stores the extraction result of the column data in association with each row, and a projection result formatter 115 that converts the column data extraction result to the row-oriented data and outputs the data to the data DMA 104.

The respective composition elements of the column store search circuit 3 will be explained below.

Figure 5:
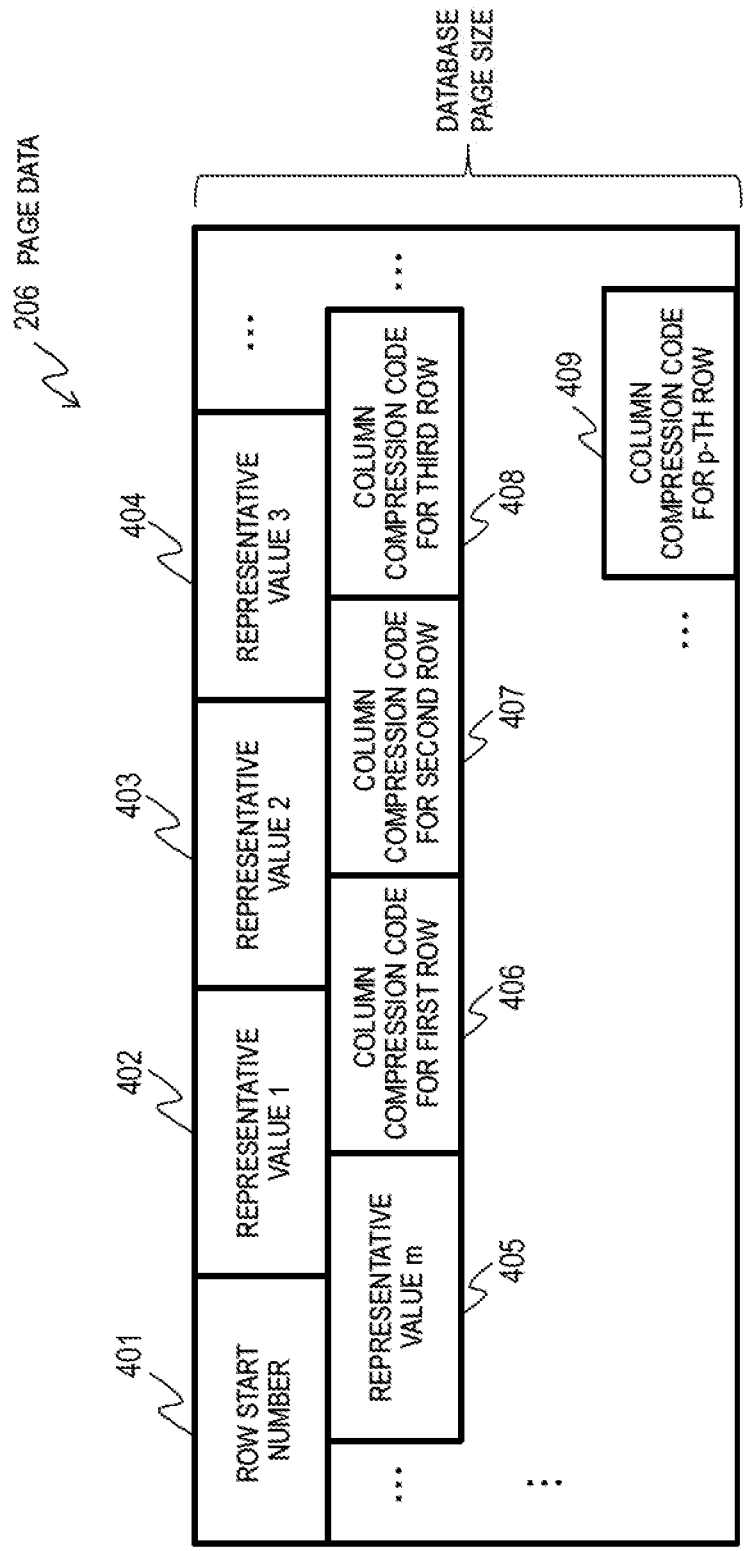
FIG. 5 is a diagram showing an example of the format of the page data according to the first embodiment of this invention.

The column decompression circuit 109 first decompresses compressed page data to handle the data in the column store DB 4. In Embodiment 1, the compression method using a table per page as shown in FIG. 5 below will be explained as one example.

The control CPU 105 manages the column number for the page data input into the column store search circuit 3.

The column decompression circuit 109 extracts data for each column from the page data of the column store DB 4, and transfers the column data to the data search circuit 110, the data projection circuit 113, or the data buffer 106 as described below.

The data search circuit 110 conducts a search process by comparing the column data decompressed by the column decompression circuit 109 with the first search condition. Specifically, the data search circuit 110 compares the column data with the first search condition for each row using the first search condition set for each column by the search request, and stores the comparison result in the search result intermediate buffer 111 for each row.

The search result intermediate buffer 111 is a buffer that stores the comparison result (search result) of the data search circuits 110-1 to 110-$k$. The search result intermediate buffer 111 stores one-bit of comparison result per column data, for example. If the column data matches the first condition, "1" is set in the buffer, and if the column data does not match the first condition, "0" is set in the buffer.

The search result aggregation circuit 112 sums up the content of the search result intermediate buffer 111, and generates the final search result for each row. The search result aggregation circuit 112 performs logical calculation on the comparison results between the second search condition included in the search request and the comparison results in the search result intermediate buffer 111, and generates the final comparison result, which is the final search result for each row. The number of final comparison results corresponds to the total number of the rows in the page data.

The data projection circuit 113 compares the final comparison results for each row, which are output from the search result aggregation circuit 112, with the column data output from the column decompression circuit 109, extracts data of the rows that meet the second search condition, and stores the data in the projection result intermediate buffer 114.

The projection result intermediate buffer 114 stores the output data from the data projection circuits 113-1 to 113-$k$ for each column. When the data is complete for one row, the projection result intermediate buffer 114 outputs the row data to the projection result formatter 115. The configuration of the projection result intermediate buffer 114 may be the same as that of the search result intermediate buffer 111 shown in FIG. 8. It is also possible to output data to the projection result formatter 115 after the comparison of all of the columns (or columns in the specified search area) is completed from the first row to the last row of the page data 206.

The projection result formatter 115 generates row-oriented data by converting the column data for each row stored in the projection result intermediate buffer 114, and outputs the data to the data DMA 104 to return the data back to the computer 1 as a search result.

The search process in the computer system is conducted in the following manner. First, the host CPU 11 of the computer 1 sends, to the control CPU 105 of the flash storage 2, a search request for the column store DB 4.

The control CPU 105 activates the flash controller 107, and the flash controller 107 reads out the compressed page data of the column store DB 4 from the flash memory 108, and stores the data in the data buffer 106.

The control CPU 105 provides the page data stored in the data buffer 106 to the column decompression circuit 109, and the column decompression circuit 109 decompresses the compressed data and generates (restores) the column data. The decompressed column data is input into the data search circuit 110, and is compared with the first search condition set for each column. The comparison result is stored in the search result intermediate buffer 111.

When the search process for the target column data is completed, the search result intermediate buffer 111 sends the comparison result for each row to the search result aggregation circuit 112.

The search result aggregation circuit 112 performs logical calculation to determine whether each row meets the second search condition or not based on the comparison result of the row, and saves the logical calculation result (final comparison result) for each row.

Next, the control CPU 105 reads out the page data to be projected from the data buffer 106, and causes the column decompression circuit 109 to decompress the column data, and inputs the decompressed column data and the final comparison result of the search result aggregation circuit 112 into the data projection circuit 113.

The data projection circuit 113 determines whether each row of column data is to be projected or not based on the final comparison result of the search result aggregation circuit 112, and stores only the column data to be projected in the projection result intermediate buffer 114.

When this process is completed for all columns to be projected, the data projection circuit 113 outputs row data (selected column data) stored in the projection result intermediate buffer 114 into the projection result formatter 115.

After receiving the selected column data for each row, the projection result formatter 115 converts the selected column data for each row to row-oriented data, thereby generating row-oriented data, and transfers the row-oriented data to the host main memory 102 from the data DMA 104.

Through the process described above, the column data can be generated by decompressing the compressed page data of the column store DB 4, a search process can be performed on the column data in accordance with the search request, and the search result converted to the row-oriented data can be returned to the computer 1.

<Column Decompression Circuit>

Figures 3, 4:
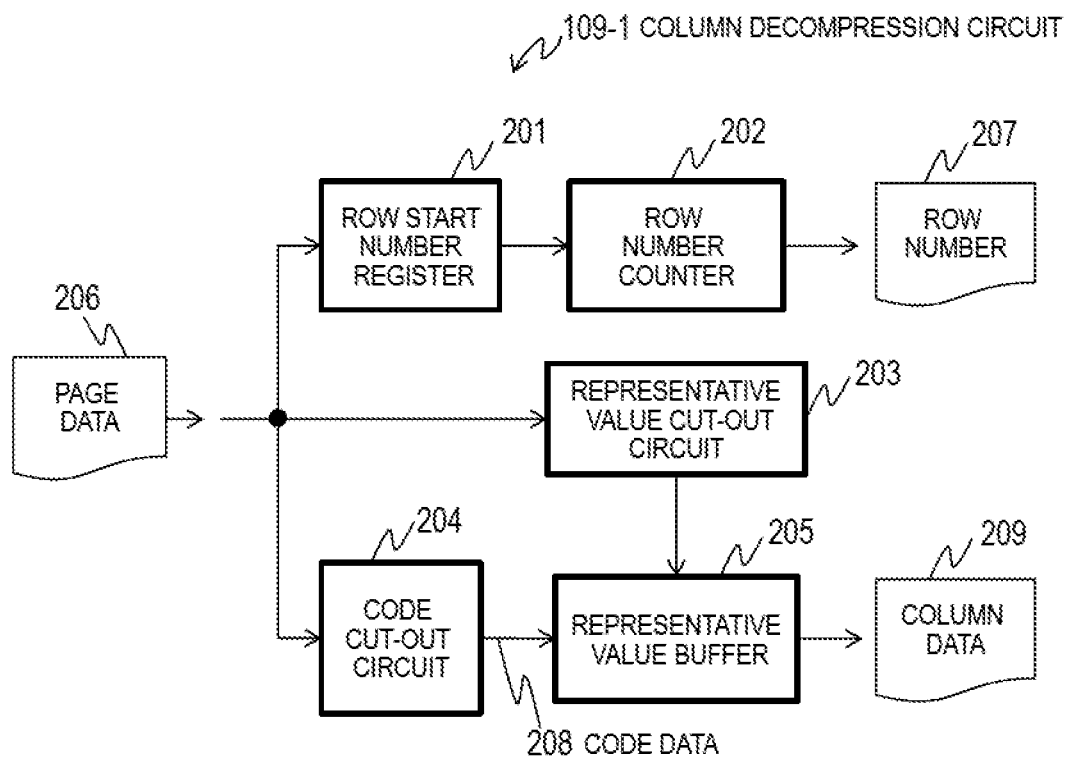
FIG. 3 is a block diagram showing an example of the configuration of the column decompression circuit according to the first embodiment of this invention.
FIG. 4 is a diagram showing an example of the representative buffer according to the first embodiment of this invention.

FIG. 3 is a block diagram showing an example of the configuration of the column decompression circuit 109-1. The other column decompression circuits 109-2 to 109-$k$ have the same configuration, and therefore, overlapping descriptions will be omitted.

The column decompression circuit 109-1 (will be denoted with 109 below) receives page data 206, which is a reading unit for the column store DB 4. The column decompression circuit 109 includes a row start number register 201 and a row number counter 202 for inputting the page data 206 from the data buffer and outputting a row number 207, a representative value cut-out circuit 203 that cuts out a representative value of a column in the page from the page data 206, and a code cut-out circuit 204 and a representative value buffer 205 that outputs column data 209 based on the page data 206 and the representative value.

In the row start number register 201, the row number of the first column provided to each page, which is a management unit of the column store DB 4, is written by the control CPU 105. The format of the page data 206 of the column store DB 4 will be explained in detail below with reference to FIG. 5.

The row number counter 202 uses the value of the row start number register 201 as an initial value of the top of the page, increments the number by one for each compression code 1, and outputs the row number 207 as the counter value. The row number counter 202 outputs the row number 207 from the row start number to the last compression code of the page data 206.

The representative value cut-out circuit 203 cuts out a representative value of the column used for compressing the column store DB 4 from the page data 206, and stores the representative value in the representative value buffer 205 described below.

The code cut-out circuit 204 cuts out a code of each row compressed in the page data 206 for each column data (one row), and outputs the code as the code data 208. The code data 208 functions as a key to generate decompressed column data 209 from the representative buffer 205 described below.

The representative buffer 205 is a reference table for decompressing the compressed page data 206. The representative buffer 205 receives the representative value used for compression from the representative value cut-out circuit 203, searches for a table using the code data 208 output from the code cut-out circuit 204, and outputs the searched representative value as the column data 209 corresponding to a row of the code data 208. The column data 209 output from the column decompression circuit 109 can be written in the data buffer 106, for example.

The column decompression circuit 109 generates the column data 209 based on the input page data 206 in the order of the row number for each column, and outputs the column data.

FIG. 4 is a diagram showing an example of the representative value buffer 205. The representative value buffer 205 is a table that includes a compression code 301 to store the value that indicates a representative value of the column data and a representative value 302 to store the value that represents the values of columns included in the page data 206 in one record.

The figure shows an example in which compression codes 1 to k are stored in the compression code 301, and representative values 1 to k are stored in the representative value 302. With this representative value buffer 205, the representative value 302 can be output as the column data 209 from the input code data 208.

When the page data 206 is input, the column decompression circuit 109 first reads out the row start number 401 stored in the top of the page data 206, and stores the data in the row start number register 201 as described below in FIG. 5.

Next, the column decompression circuit 109 reads out the representative value (402 to 405) described below from the page data 206 in an appropriate order, extracts the representative value with the representative value cut-out circuit 203, and stores the representative value in the representative value buffer 205. In this process, the compression codes included in the representative value 1 (402) to the representative value m (405) are stored in the compression code 301 of the representative value buffer 205. In the compression code 301, a plurality of compression codes can be stored.

Next, the column decompression circuit 109 reads out the column compression codes 406 to 409 described below from the page data 206 in an appropriate order, and extracts the code data 208 with the code cut-out circuit 204. The column decompression circuit 109 searches through the representative value buffer 205 using the extracted code data 208 as a key, and outputs the found representative value 302 as the column data 209.

FIG. 5 is a diagram showing an example of the format of the page data 206 input into the column decompression circuit 109 shown in FIG. 2.

In the page data 206, the row start number 401 is stored first, followed by the representative value 1 (402) to representative value m (405), the first row column compression code 406 to p-th row column compression code 409.

In the row start number 401, the row number of the first column is written, among the data stored in the page data 206. The value of the row start number 401 is stored in the row start number register 201.

The column data stored in the page data 206 is compressed using the representative values and compression codes. A simple table method is employed in Embodiment 1, but other compression methods may alternatively be used.

The representative value 1 (402) to the representative value m (405) are each a value used for each column in the page data 206 and a compression code that denotes the value. The representative value is the column data used to decompress the compressed data, and by setting the representative values 402 to 405 indicated by the values of the first row column compression code 406 to the p-th row column compression code 409 to each row, the data can be restored as the column data 209.

In the page data 206 of Embodiment 1, the row start number 401 is set for the data of each column included in the page. This way, when each circuit of the column store search circuit 3 described below reads out the page data 206 at the same time and outputs the search result, respectively, the row number 207 in the search result can be identified.

As described above, by employing the data structure in which the row start number 401 is set at a prescribed location in the page data 206 in the column store DB 4, the page data 206 with different row start numbers 401 can be processed in parallel with each other by a plurality of column decompression circuits 109, a plurality of data search circuits 110, and a plurality of data projection circuits 113. That is, in each processing circuit, the first row number of the column data 209 is identified, and therefore, the control CPU 105 can instruct the column store search circuit 3 to conduct a search process regardless of the order of the row start number 401 of the page data 206, and sort out data based on the row number of the row-oriented data 1205 output by the column store search circuit 3. This makes it possible for the flash storage 2 to speed up the process by conducting a plurality of search processes on the page data 206 at the same time.

<Data Search Circuit>

Figures 6, 7:
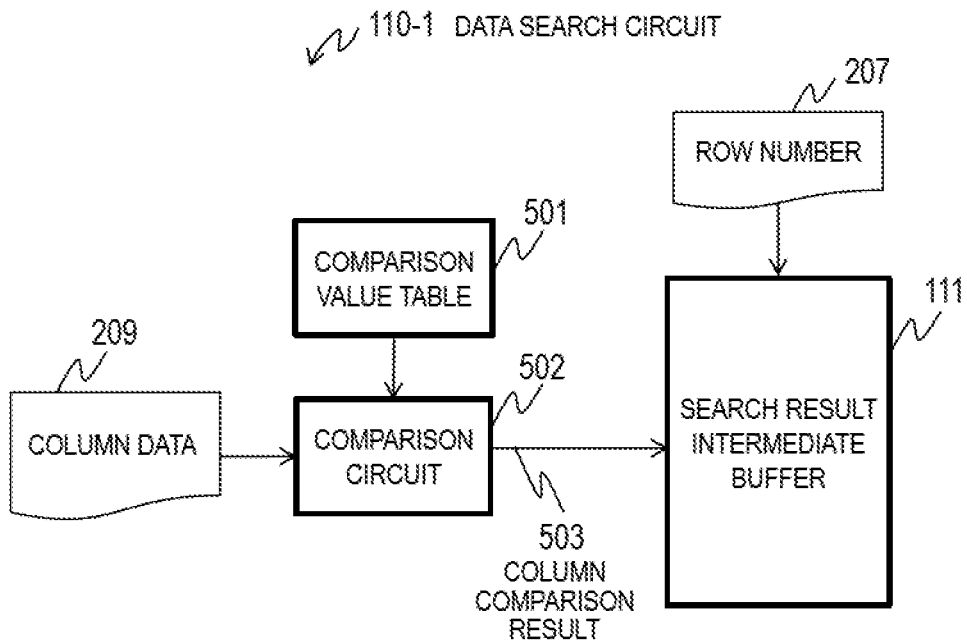
FIG. 6 is a block diagram showing an example of the data search circuit according to the first embodiment of this invention.
FIG. 7 is a diagram showing an example of the comparison value table according to the first embodiment of this invention.

FIG. 6 is a block diagram showing an example of the data search circuit 110-1 shown in FIG. 2. Other data search circuits 110-2 to 110-$k$ have the same configuration as the data search circuit 110-1.

The data search circuit 110-1 (will be denoted with 110 below) includes a comparison value table 501, a comparison circuit 502 that receives the column data 209 and outputs a column comparison result 503, and a search result intermediate buffer 111 that receives the row number 207 and the column comparison result 503 and stores the row number 207 and the column comparison result 503 in association with each other.

The comparison value table 501 is a table including the column number to be searched and the comparison value and comparison condition to be compared with the column data 209. The column number, the comparison value, and the comparison condition are based on the data included in the first search condition of the search request received by the flash controller 107. The control CPU 105 selects the first search condition from the search request, and sets the condition in the comparison value table 501.

The control CPU 105 manages the column number for each page data 206 of the data buffer 106 to be searched by the column store search circuit 3. The control CPU 105 can notify the column decompression circuit 109 and the data search circuit 110 of the column number that is the current search target as a process column number 1105, which will be described below.

The comparison circuit 502 compares the column data 209 with the comparison value and comparison condition for each column, referring to the comparison value table 501. The comparison circuit 502 looks up the comparison value and the comparison condition corresponding to each column from the comparison value table 501, and determines whether the column data 209 matches the comparison condition or not from the first row to the last row, respectively. The comparison circuit 502 then outputs the determination results to the search result intermediate buffer 111 as the column comparison result 503.

The search result intermediate buffer 111 receives the row number 207 from the column decompression circuit 109, and stores the column comparison result 503 for each column, which was received by the comparison circuit 502, in association with the row number 207. When the one-bit data structure is employed, for example, the column comparison result 503 is set to "1" if the condition is met, and set to "0" if the condition is not met. Thus, in the search result intermediate buffer 111, the column comparison result 503 made of a pair of the row number 207 and the search result (comparison result) based on the first search condition is stored for each column.

FIG. 7 is a diagram showing an example of the comparison value table 501. The comparison value table 501 includes a column number 601, a comparison value 602, and a comparison condition 603 in one record.

The column number 601 stores therein the number (or identifier) of a column to be compared. The comparison value 602 stores therein a value or text to be compared with the column data 209. The comparison condition 603 stores therein a condition to be compared with the comparison value 602. The comparison condition 603 may include a relational operator such as >, =, and ≥, or a text search symbol such as wild card.

The comparison table 501 is configured by the control CPU 105. After receiving a search condition, the control CPU 105 obtains the comparison value, comparison condition, and column number from the first search condition included in the search request, and enters those in the comparison value table 501 as shown in the figure.

<Search Result Intel mediate Buffer>

Figure 8:
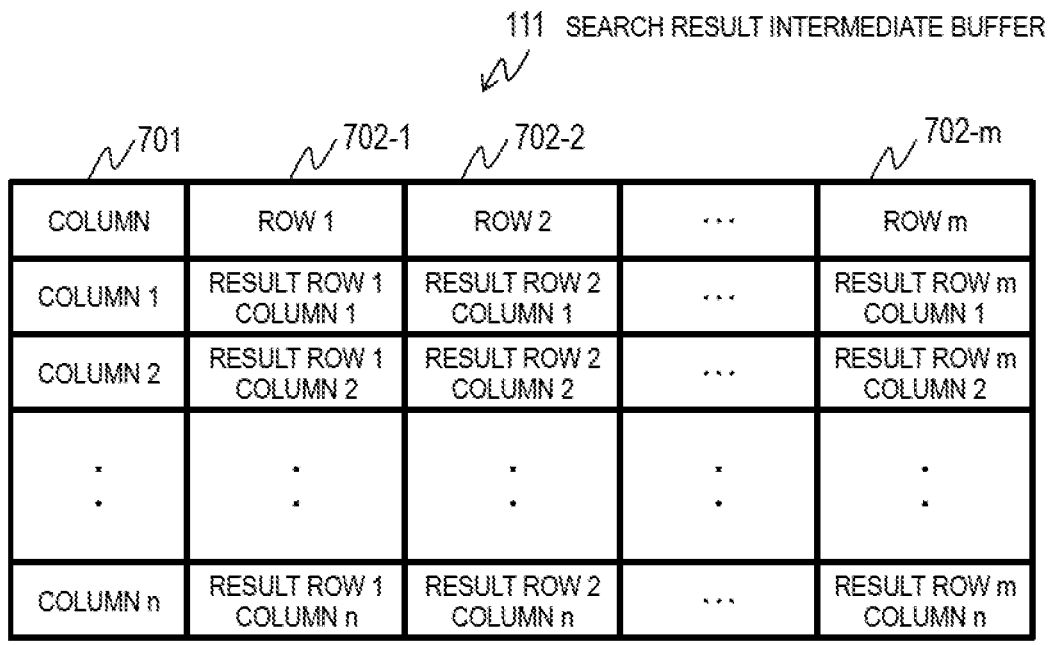
FIG. 8 is a diagram showing an example of the search result intermediate buffer according to the first embodiment of this invention.

FIG. 8 is a diagram showing an example of the search result intermediate buffer 111. The search result intermediate buffer 111 includes a column 701 that stores therein a number or identifier to identify a column of the page data 206, and row 1 (702-1) to row m (702-$m$) that store therein the column comparison result 503 corresponding to the column 701 and each row of the page data 206 in one record. In the example of the figure, the page data 206 has m rows and n columns.

As shown in FIG. 6, after receiving the column comparison result 503 of the column 701 corresponding to the column data 209, the search result intermediate buffer 111 stores the column comparison result 503 in one of the row 1 (702-1) to the row m (702-$m$) corresponding to the row number 207 input from the column decompression circuit 109.

As described above, the search result intermediate buffer 111 stores the column comparison result 503, which is the search result of the page data 206, as a table with m rows and n columns.

<Search Result Aggregation Circuit>

Figure 9:
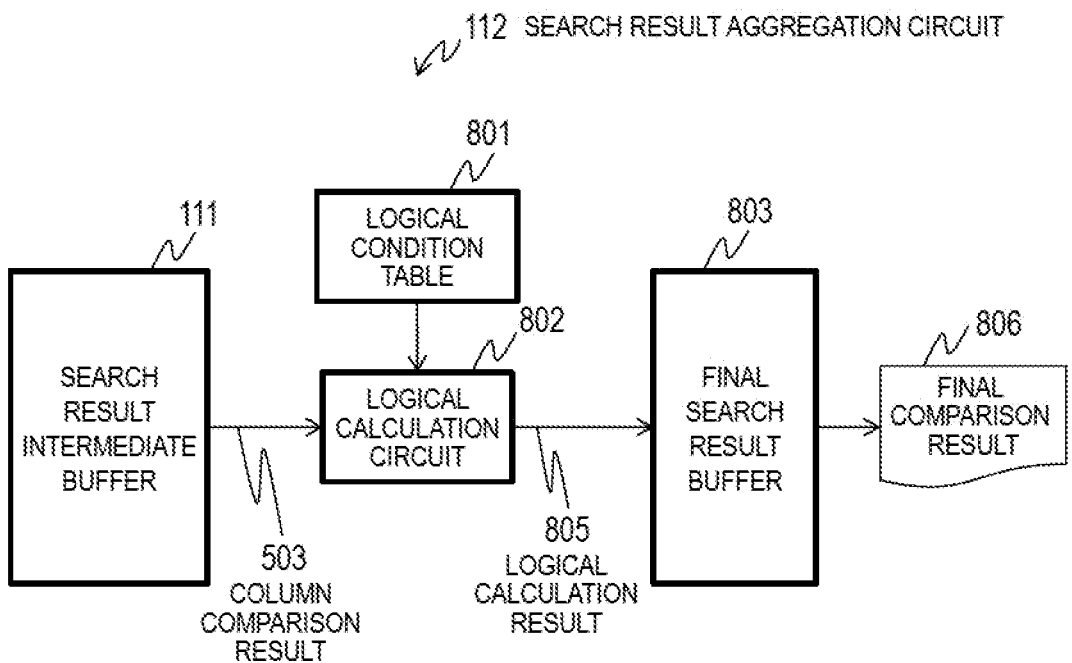
FIG. 9 is a block diagram showing an example of the search result aggregation circuit according to the first embodiment of this invention.

FIG. 9 is a block diagram showing an example of the search result aggregation circuit 112. The search result aggregation circuit 112 includes a logical condition table 801 including the second search condition, a logical calculation circuit 802 that conducts logical calculation on the column comparison result 503 obtained from the search result intermediate buffer 111 based on the second search condition set in the logical condition table 801, and a final search result buffer 803 that stores the logical calculation result 805.

The second search condition is retrieved from the search request received by the control CPU 105, and set in the logical condition table 801. The second search condition may include a logical product or logical sum such as a combination of values in respective columns in the row direction of the column comparison result 503, for example.

The comparison circuit of FIG. 6 is configured to compare the column data 209 with the first search condition including the comparison value 602 and comparison condition 603 for each column number 601. On the other hand, the logical calculation circuit 802 conducts logical calculation on the column comparison result 503 based on the second search condition that specifies the search condition between respective columns.

The logical calculation circuit 802 starts the process when the data search circuit 110 has output all comparison results for the columns of the target page data 206 in the area specified by the control CPU 105.

The logical condition table 801 has set therein the second search condition in advance as described above. The column comparison result 503 stored in the search result intermediate buffer 111 is merely a simple comparison result for one row (field) in the column. Thus, it is not possible to execute complex search conditions such as comparing the respective columns only with the column comparison result 503.

In order to solve this problem, a logical calculation condition (second search condition) for the values in the column comparison result 503 is set in the logical condition table 801 in the row direction of the page data 206. The logical calculation circuit 802 conducts logical calculation on the column comparison result 503 by applying a plurality of search conditions in the row direction of the page data 206, and conducts more complex search than the comparison circuit 502 described above. The results of the logical calculation are the second comparison (or search) results.

The logical calculation circuit 802 receives the column comparison result 503, conducts logical calculation based on the second search condition of the logical condition table 801, and outputs the logical calculation result 805. The logical calculation result 805 is comprised of a pair of the row number and the second comparison result.

For example, the logical calculation result 805 includes a value that indicates whether the column comparison result 503 of each row matches the second search condition or not. If the column comparison result 503 of a row matches the second condition, "1" is set in the logical calculation result 805, and if the column comparison result 503 does not match the second condition, "0" is set in the logical calculation result 805.

The final search result buffer 803 stores the logical calculation result 805 of each row number 207 from the first to last rows.

The logical calculation result 805 of the final search result buffer 803 is output as the final comparison result 806. This final comparison result 806 is used to determine whether the data is to be projected or not in the data projection circuit 113 described below. The final comparison result 806 may include a row number or identifier to be selected as the search result.

The process of the search result aggregation circuit 112 is conducted as follows. The logical calculation circuit 802 first reads out the column comparison result 503 for each row from the search result intermediate buffer 111, and executes the logical calculation based on the second search condition set in the logical condition table 801.

The logical calculation circuit 802 determines whether the read-out row is to be selected as the final search result or not, and stores this determination result in the final search result buffer 803 with the row umber 207 as the logical calculation result 805. The logical calculation result 805 of the final search result buffer 803 is output as the final comparison result 806, and enters the data projection circuit 113 described below.

The final comparison result 806 is a value indicating whether the data for each row of the page data 206 is to be selected as the search result or not. For example, if the row meets the second search condition (hit), the search result aggregation circuit 112 enters "1" in the value of the final comparison result 806 for that row. On the other hand, if the row does not meet the second search condition (miss), the search result aggregation circuit 112 enters "0" in the value of the final comparison result 806 for that row.

With the final comparison result 806, it is possible to identify the rows of the column data 209 that will be the search result in response to the search request. Thus, it is also possible to output the final comparison result 806 as the search result.

Figures 10, 11:
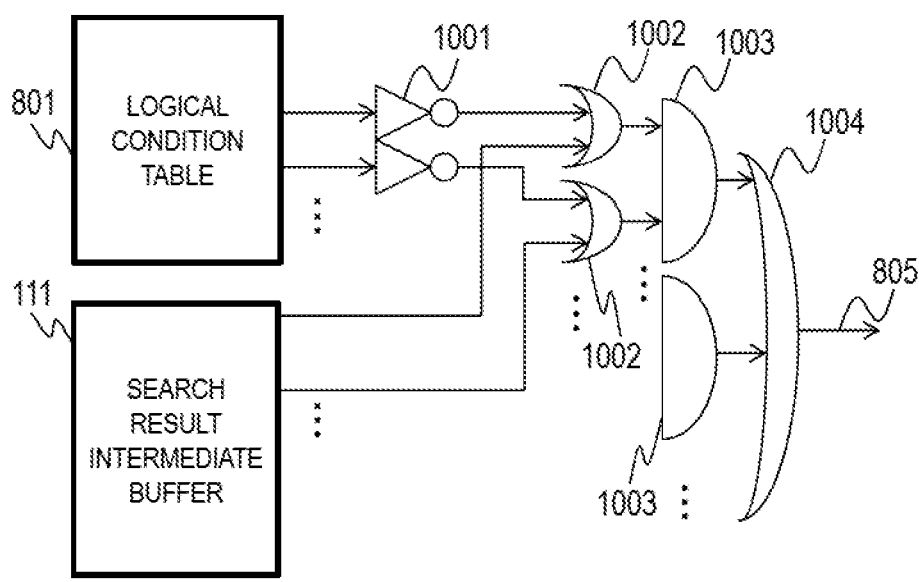
FIG. 10 is a diagram showing an example of the logical condition table according to the first embodiment of this invention.
FIG. 11 is a block diagram showing an example of the logical calculation circuit according to the first embodiment of this invention.

FIG. 10 is a diagram showing an example of the logical condition table 801. The logical condition table 801 includes, in one record, a condition 901 to store an identifier for the second search condition, and an item 1 enabled bit 902-1 to item p enabled bit 902-p that each store a flag bit to indicate whether the item 1 to item p is enabled (that is, the logical calculation result 805=1) or not for each condition 901.

In the example of the figure, for each record from the condition 1 to the condition o, the item 1 enabled bit 902-1 to the item p enabled bit 902-p indicate whether each item (column) is enabled is disabled. The value of the enabled bit for each item indicates "1," if enabled, which means that the final comparison result 806 matches the second search condition, and indicates "0" if disabled, which means that the final comparison result 806 does not match the second search condition.

The logical sum is obtained from the respective conditions 901 (column direction), and the logical product is obtained from the item 1 enabled bit 902-1 to item p enabled bit 902-p in the row direction.

The logical condition table 801 is based on the second search condition obtained by the control CPU 105 from the search request, and output to the search result aggregation circuit 112.

FIG. 11 is a block diagram showing an example of the logical calculation circuit 802. In the logical calculation circuit 802, a plurality of inversion logical circuits 1001, a plurality of logical sum circuit 1002, a plurality of logical product circuit 1003, and a logical sum circuit 1004 are connected to each other in an appropriate order.

The logical calculation circuit 802 causes the values output from the logical condition table 801 to be inverted in the inversion logical circuit 1001, inputs the values into the logical sum circuit 1002, and generates a logical sum with the output from the search result intermediate buffer 111. This way, the items that are not compared with the second search condition are always true.

Next, the output from the logical sum circuit 1002 is input into the logical product circuit 1003, and the logical product circuit 1003 outputs the logical product of each item of the search result intermediate buffer 111. Whether the item matches the second search condition or not is determined by this logical product. Lastly, the logical sum circuit 1004 calculates a logical sum for all of the second search conditions, thereby calculating the results for all of the second search conditions as the logical calculation result 805.

<Data Projection Circuit>

Figure 12:
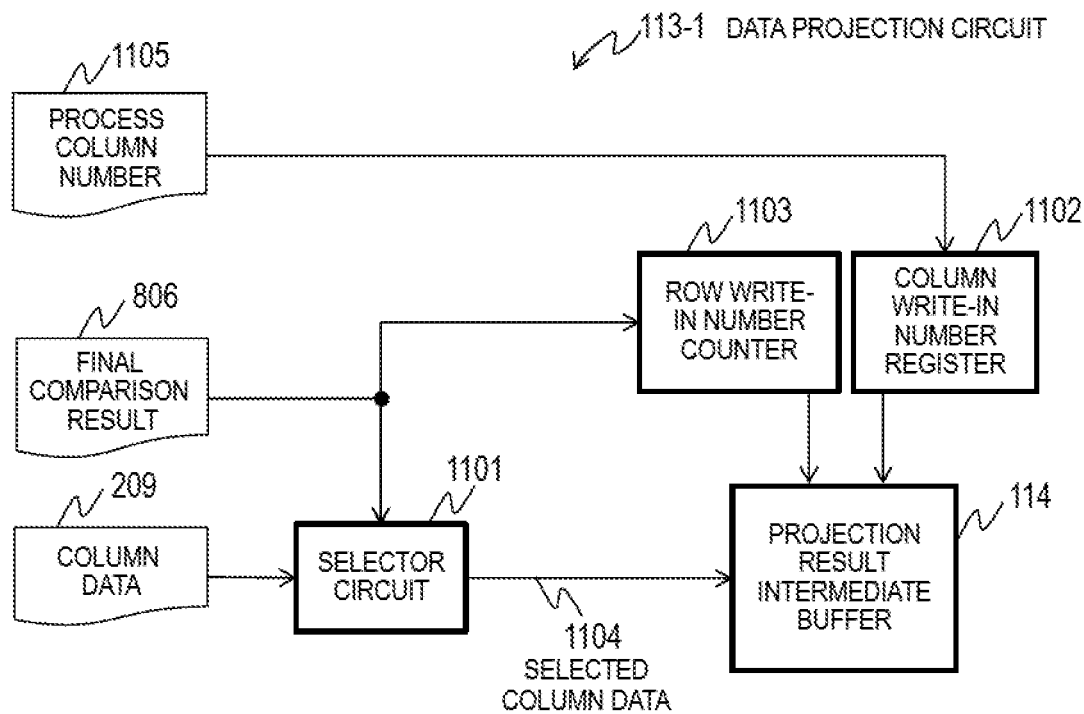
FIG. 12 is a block diagram showing an example of the data projection circuit according to the first embodiment of this invention.

FIG. 12 is a block diagram showing an example of the data projection circuit 113-1. Other data projection circuits 113-2 to 113-k have the same configuration, and therefore, only the data projection circuit 113-1 (will be denoted with 113 below) will be explained below, and the overlapping explanations are omitted.

The data projection circuit 113 receives the column data 209, the final comparison result 806, and the process column number 1105, and outputs the selected column data 1104, and the row number and column number to be written in. The data projection circuit 113 includes a selector circuit 1101 that selects the column data 209, a row write-in number counter 1103, and the column write-in number register 1102.

The column data 209 is input from the column decompression circuit 109 in a manner similar to above. The final comparison result 806 is output from the final search result buffer 803. The process column number 1105 is a number written by the control CPU 105 into the column decompression circuit 109 when the column decompression circuit 109 is activated. The control CPU 105 provides the column number to be processed to the column decompression circuit 109 and the data search circuit 110. The data projection circuit 113 obtains the process column number 1105 from the control CPU 105.

The selector circuit 1101 receives the column data 209 from the column decompression circuit 109, and receives the final comparison result 806 from the final search buffer 803 of the search result aggregation circuit 112. The selector circuit 1101 outputs the data of the rows that meet the final comparison result 806 only, among the received column data 209, to the projection result intermediate buffer 114 as the selected column data 1104. That is, only the column data 209 of the rows that meet the second search condition is output to the projection result intermediate buffer 114 as the selected column data 1104.

The column write-in number register 1102 obtains the process column number 1105 provided to the column decompression circuit 109 from the control CPU 105, and provides the column number to the projection result intermediate buffer 114. The projection result intermediate buffer 114 determines the number of the column in which the selected column data 1104 is to be written, based on the information provided by the column write-in number register 1102.

The row write-in number counter 1103 provides the number of rows specified by the final comparison result 806 to the projection result intermediate buffer 114. The projection result intermediate buffer 114 determines the number of the row in which the selected column data 1104 is to be written, based on the information provided by the row write-in number counter 1103.

The data projection circuit 113 writes into the projection result intermediate buffer 114 the data of the rows that meet the final comparison result 806 only, among the column data 209, as the selected column data 1104. The write-in location is defined by the column write-in number register 1102 and the row write-in number counter 1103. This way, the values of the page data 206 that match the search request are written in the projection result intermediate buffer 114 in the row direction.

<Projection Result Formatter>

Figure 13:
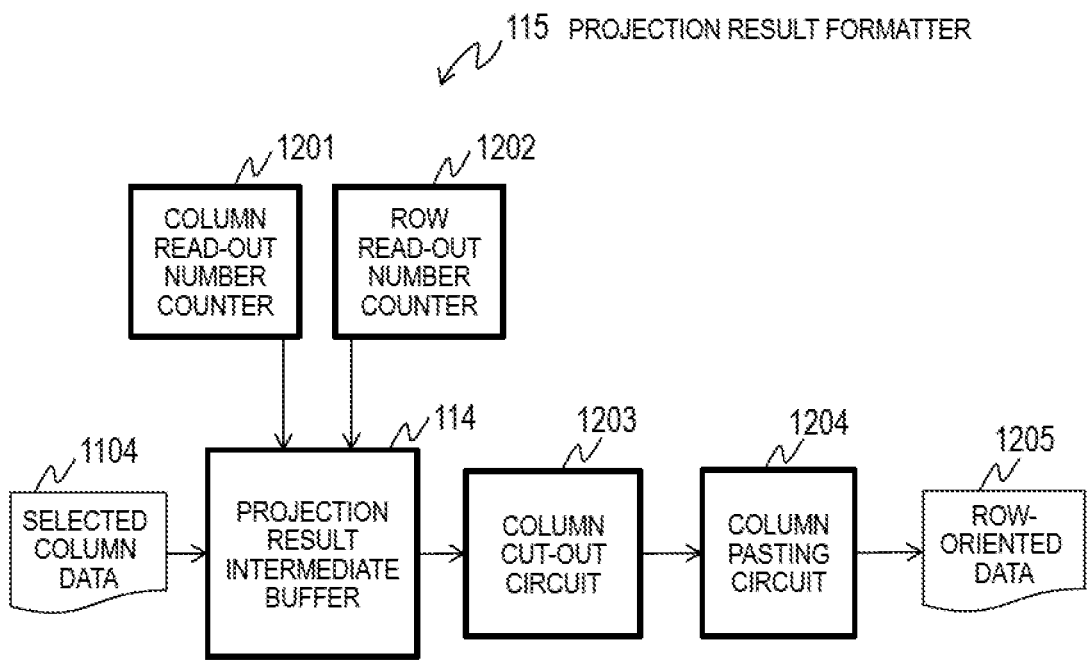
FIG. 13 is a block diagram showing an example of the projection result formatter according to the first embodiment of this invention.

FIG. 13 is a block diagram showing an example of the projection result formatter 115. The projection result formatter 115 is a circuit that reads out the selected column data 1104 stored in the projection result intermediate buffer 114, converts the data into the row-oriented data 1205, and outputs the converted data to the data DMA 104.

The projection result formatter 115 includes a column read-out number counter 1201 that enters the first column to read out into the projection result intermediate buffer 114, a row read-out number counter 1202 that enters the first row to read out, a column cut-out circuit 1203 that cuts out the columns read out from the projection result intermediate buffer 114 for each row, and a column pasting circuit 1204 that pastes the extracted columns into the row-oriented data 1205.

The column read-out number counter 1201 is a counter that indicates the position of the data to be read out from the projection result intermediate buffer 114 in the column direction. The row read-out number counter 1202 is a counter that indicates the position of the data to be read out from the projection result intermediate buffer 114 in the row direction. The initial value of the row read-out number counter 1202 is the position of the beginning of the selected column data 1104 written into the projection result intermediate buffer 114, for example. The column read-out number counter 1201 and the row read-out number counter 1202 may be configured by the control CPU 105.

The column cut-out circuit 1203 cuts out valid data from the data read out from the projection result intermediate buffer 114. The column pasting circuit 1204 arranges the valid data extracted by the column cut-out circuit 1203 in a prescribed area in the data buffer 106, and generates the row-oriented data 1205. The column pasting circuit 1204 outputs the generated row-oriented data 1205 to the data DMA 104.

First, the projection result formatter 115 enters the row number to read out first (first row number) in the row read-out number counter 1202, increments the column read-out number counter 1202 from the first column number (1, for example), and successively reads out the content of the projection result intermediate buffer 114 as the data of the same row.

In the projection result formatter 115, the column cut-out circuit 1203 cuts out valid data from the read-out data, and the column pasting circuit 1204 puts together the extracted data in the data buffer 106 to generate the row-oriented data 1205, and outputs the row-oriented data 1205 to the data DMA circuit 104.

Figure 14:
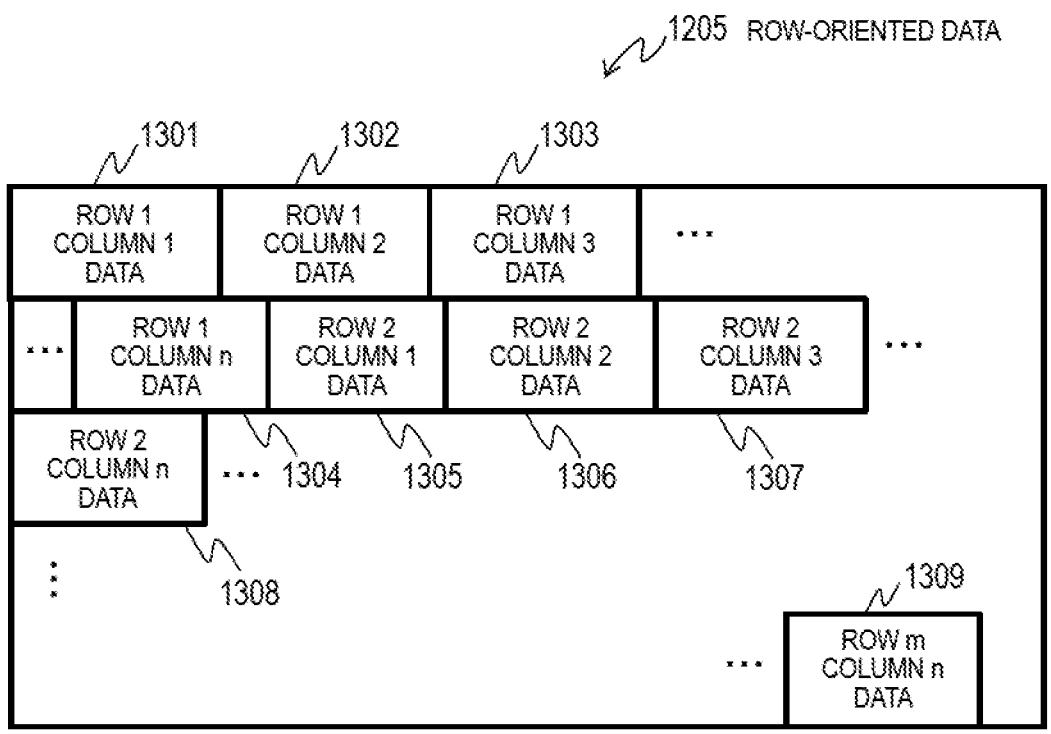
FIG. 14 is a diagram showing an example of the format of the row-oriented data according to the first embodiment of this invention.

FIG. 14 is a diagram showing an example of the format of the row-oriented data 1205 output from the projection result formatter 115.

The row-oriented data 1205 is stored in a prescribed area of the data buffer 106, and includes respective pieces of data from row-one column-one data 1301, row-one column-two data 1302, and row-one column-three data 1303 and such up to row-one column-n data 1304. After the data of the first row is stored, respective pieces of data from row-two column-one data 1304, row-two column-two data 1305, and row-two column-three data 1307 and such up to row-two column-n data 1308 are arranged in this order. The respective pieces of data are arranged in the order of rows and columns up to the row-m column-n data, which is the last row, thereby completing the row-oriented data 1205.

Figure 15:
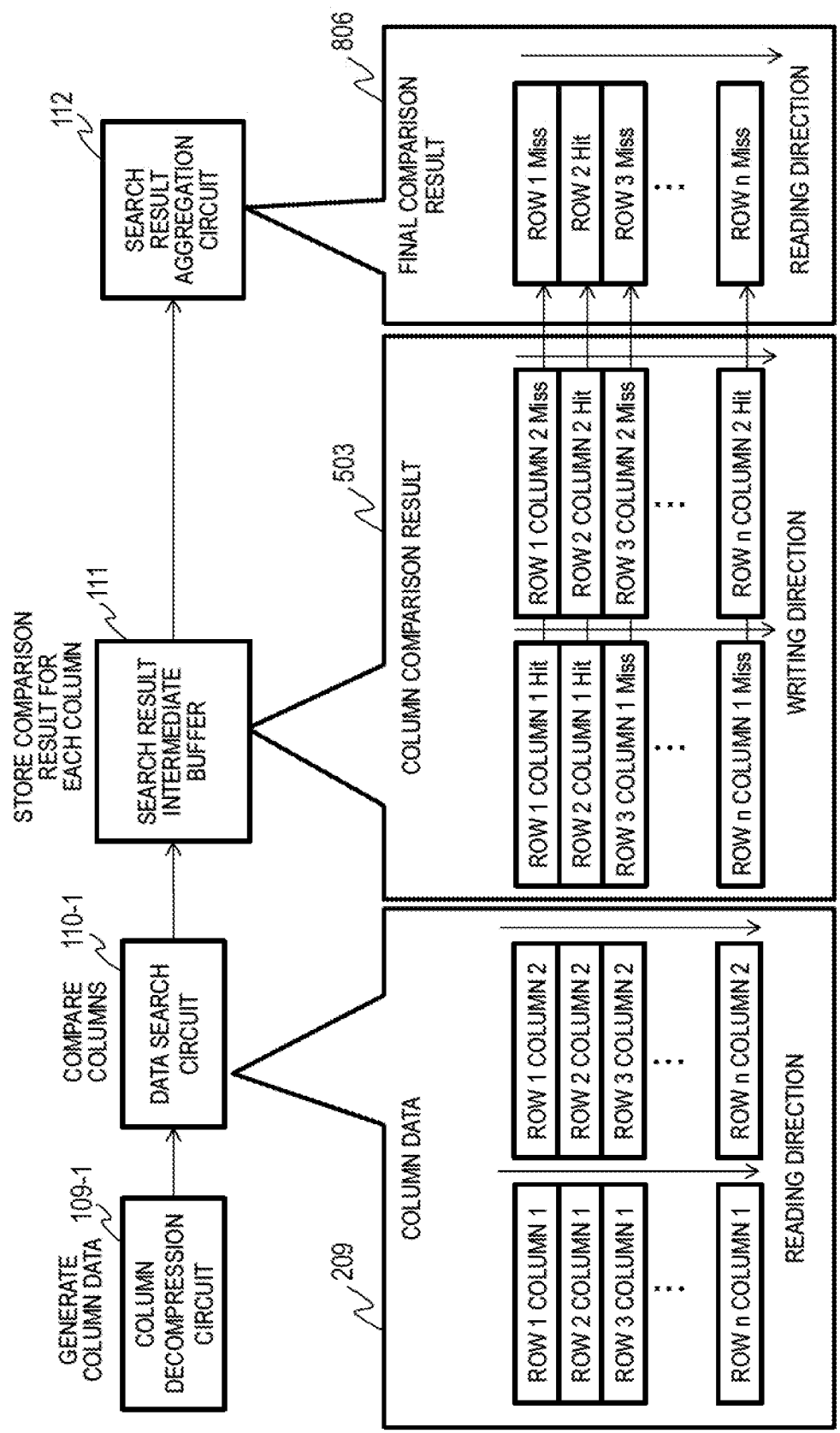
FIG. 15 is a diagram showing the first half of the search process for the column store DB according to the first embodiment of this invention.
Figure 16:
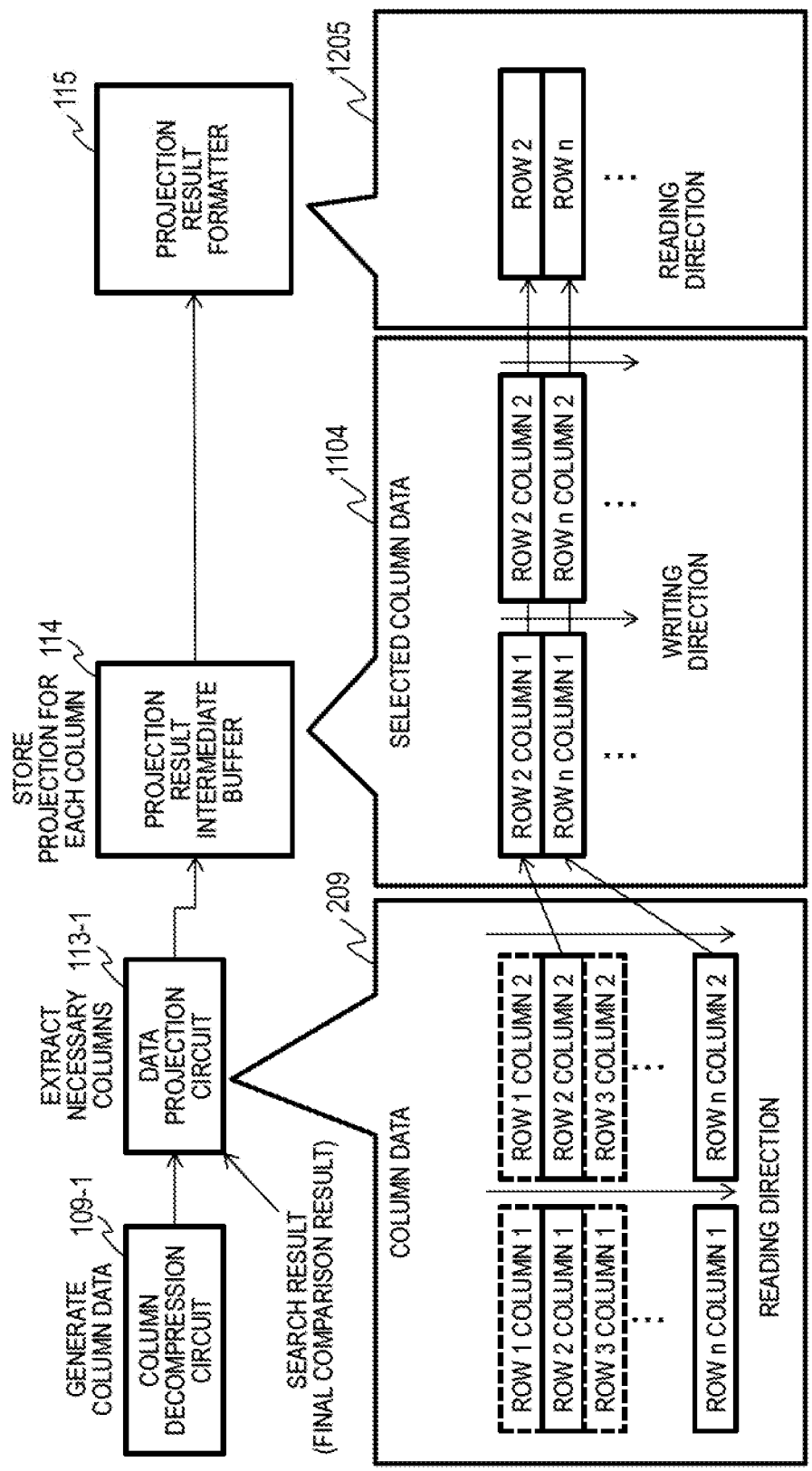
FIG. 16 is a diagram showing the second half of the search process for the column store DB according to the first embodiment of this invention.

FIGS. 15 and 16 are diagrams for explaining an example of a search process performed by the column store search circuit 3. FIG. 15 is a diagram showing the first half of the search process performed on the column store DB 4 by the column store search circuit 3. FIG. 16 is a diagram showing the second half of the search process performed on the column store DB 4 by the column store search circuit 3. Those figures shows an example in which a search process is conducted on the column store DB 4 with n rows and two columns.

In FIG. 15, the control CPU 105 that received the search request from the computer 1 instructs the flash controller 107 to read the column store DB 4, and the flash controller 107 reads the column store DB 4 into the data buffer 106. Next, the control CPU 105 activates the column decompression circuit 109. The control CPU 105 provides each column decompression circuit 109 to be activated with the process column number 1105, thereby specifying the column to be processed first.

The column decompression circuits 109-1 to 109-k read the page data 206 of the process column number 1105 specified by the control CPU 105, among the data in the column store DB4, and conducts a decompression process to generate (or restore) the column data 209. FIG. 15 shows an example in which the column data 209 with n rows and two columns is generated.

After the column data 209 is generated, the column decompression circuit 109 instructs the data search circuit 110 to start the search process. Alternatively, the search process may be started upon instruction from the control CPU 105. The data search circuit 110 compares the column data 209 with the comparison value 602 and the comparison condition 603 based on the first search condition, thereby performing the first search process, and stores the column comparison result 503 in the search result intermediate buffer 111.

In the example of the figure, the data search circuit 110 compares the columns of the column data 209 for each row, and the column comparison result 503 is written in the search result intermediate buffer 111 in the row direction. The figure shows an example in which "Hit" indicates the data that matches the first search condition, and "Miss" indicates the data that does not match the first search condition.

Next, the search result aggregation circuit 112 conducts logical calculation on the column comparison result 503 and the second search condition set in the logical condition table 801, and outputs the final comparison result 806 in which the row number to be output is specified.

FIG. 15 shows the case in which the condition 1 has the item 1 valid bit 902-1="1" (Hit: matching) and the item 2 valid bit 902-2="1" in the logical condition table 801 of FIG. 10, and the second search condition selects data in which the first column and second column of the same row match the first search condition. As a result, the search result aggregation circuit 112 outputs the first comparison result 806 from the first row to n-th row in this order. In the example of the figure, the row numbers and the respective search results "Hit" or "Miss," which indicates whether the row matches the second search condition or not, are shown, and in the figure, the data of the second row matches the second search condition.

Next, in FIG. 16, the data projection circuit 113 retrieves the columns (or fields) that meet the first and second search conditions. The data projection circuit 113 receives the column data 209 from the column decompression circuit 109, compares the column data 209 with the final comparison result 806 output from the search result aggregation circuit 112, extracts the column data of the rows whose final comparison result 806 is "Hit," and stores the column data in the projection result intermediate buffer 114 as the selected column data 1104. That is, the data projection circuit 113 extracts the columns of the second row from each column data 209, and writes the data in the projection result intermediate buffer 114 as the selected column data 1104.

The projection result intermediate buffer 114 stores therein the selected column data 1104 that matches the second search condition for each column, among the column data 209. After the process on the final comparison result 806 provided by the search result aggregation circuit 112, and the process on the column data 209 provided by the column decompression circuit 109 are completed, the data projection circuit 113 activates the projection result formatter 115.

The projection result formatter 115 reads out all of the selected column data 1104 for each row from the projection result intermediate buffer 114, and stores the data in the row-oriented data 1205. After all of the rows of the selected column data 1104 are stored in the row-oriented data 1205, the projection result formatter 115 outputs the row-oriented data 1205 to the data DMA 104. The projection result formatter 115 may be activated by the search result aggregation circuit 112, or the control CPU 105.

The process to extract the columns of the search result was conducted by the data projection circuit 113 on the column data 209 input from the column decompression circuit 109, but the present invention is not limited thereto. For example, the column data 209 generated by the column decompression circuit 109 may be stored in the data buffer 106, and the data projection circuit 113 may be configured to read out the column data 209 from the data buffer 16 and compare the column data 209 with the final comparison result 806.

With the process described above, when the flash storage 2 receives a search request from the computer 1, the column store search circuit 3 of the flash storage 2 conducts a search process on the column store DB 4, and returns the search result as the row-oriented data 1205.

In Embodiment 1, the column store search circuit 3 calculates the column comparison result 503 for each column by comparing the column data 209 of each column with at least one first search condition, and calculates the final comparison result 806 by determining whether the column comparison result 503 for each column matches the second search condition or not for each row. Then the column store search circuit 3 outputs, as the row-oriented data 1205, the rows that match the second search condition in the final comparison result 806.

After the flash controller 107 reads out the target page data 206 of the column store DB 4 from the flash memory 108 into the data buffer 106, the column store search circuit 3 can conduct a search process corresponding to the search request. With this configuration, in Embodiment 1, it is possible to eliminate the need for random access to the flash memory 108 unlike the conventional example described above during the search process on the column store DB 4.

Thus, with Embodiment 1, it is possible to eliminate random access for the storage device such as the flash memory 108 in performing search on the column store DB 4, and as a result, the efficiency of the search process can be improved.

When the search process is conducted by storing the column store DB 4 in a plurality of flash memories 108, a plurality of flash controllers 107 conduct a read-out process for the plurality of flash memories 108 at the same time for each read-out unit (page), and therefore, it is possible to read out data rapidly. However, because the number of columns in each page data 206 of the column store DB 4 varies, the read-out time of the flash controllers 107-1 to 107-i would vary depending on the assigned page data 206.

When the page data 206 of the column store DB 4, which was read out from the flash memories 108-1 to 108-j in parallel, is to be processed by the column store search circuit 3, which is the specialized hardware, it is necessary to input the column data into the column store search circuit 3 in a prescribed order from the first page data 206.

However, when a plurality of flash controllers 107-1 to 107-i read out the page data 206 from the flash memories 108-1 to 108-j in parallel, the read-out time may vary depending on the page, and therefore, the column store search circuit 3 would not be able to start the process until the first page data 206 is read out.

On the other hand, in Embodiment 1, in a case in which the column store DB 4 is stored in a storage device using a semiconductor memory element such as a flash memory 108, and the page data is processed by the column store search circuit 3, which is the specialized hardware, if a page other than the first page is read out before the first page, that page can be processed by the column store search circuit 3 immediately, and as a result, the processing efficiency of the column store DB 4 can be improved.

Because the column store search circuit 3 can output the row-oriented data 1205 as the search result of the column store DB 4, it is possible to reduce the application overhead in the computer 1 that uses the search result. That is, while many of the existing applications can handle the row-oriented data 1205, there are only a few applications that can handle the format of the column store DB 4.

With Embodiment 1, it is not necessary to convert the format of the column store DB 4 to the row-oriented data 1205 in the computer 1, and therefore, the search result of the column store DB 4 can be handled very easily.

Embodiment 1 described above showed an example in which the plurality of flash storages 2 are connected to the computer 1 via the I/O switch 5, but the plurality of flash storages 2 and the computer 1 may be connected to each other via network instead of the I/O switch 5.

Embodiment 1 described above showed an example in which the flash memory 108 is used for a medium to store the column store Db 4, but the present invention is not limited to this, and any non-volatile semiconductor storage medium or any non-volatile semiconductor storage part may be used.

Embodiment 1 described above showed an example in which the column store DB 4 is compressed, but if the column store DB 4 is not compressed, the column decompression circuit 109 functions as a column read-out circuit that reads out the page data 206 from the data buffer 106 and loads the data for each column.

Embodiment 2

Figure 17:
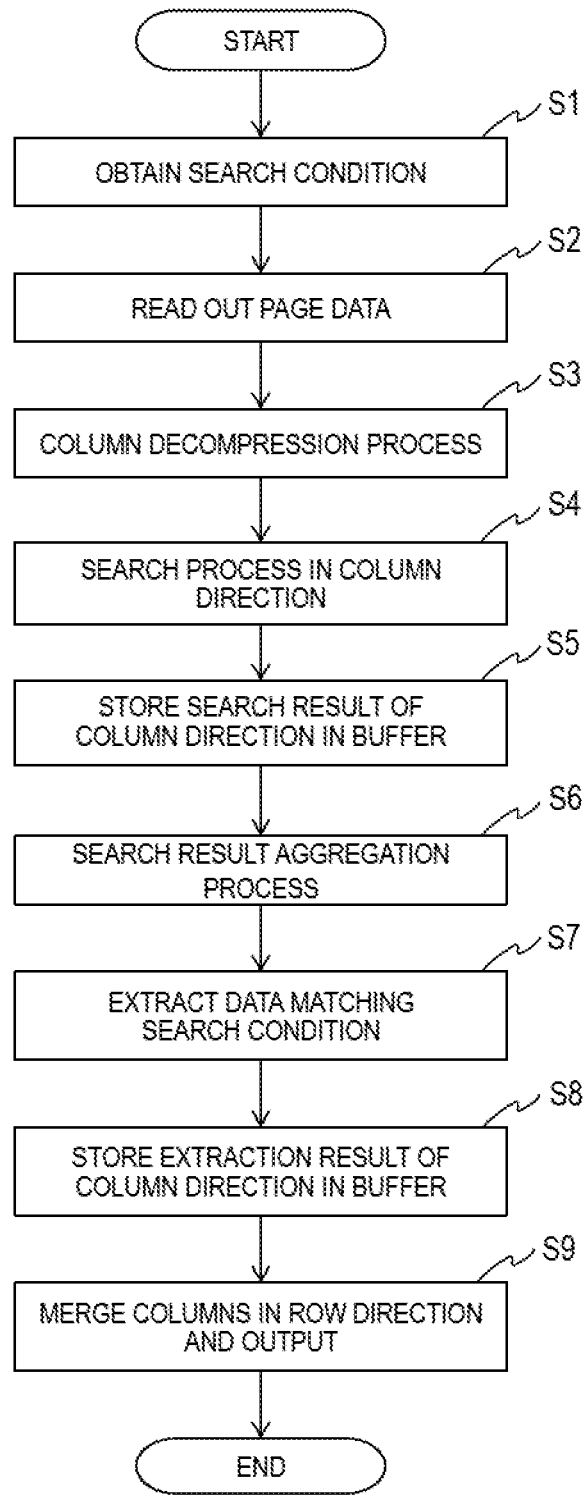
FIG. 17 is a flowchart showing an example of the search process for the column store DB according to a second embodiment of this invention.

FIG. 17 is a flowchart showing an example of the search process for the column store DB 4 in Embodiment 2 of the present invention. In Embodiment 2, the control CPU 105 executes the column store search process program, and searches through the column store DB 4, instead of the column store search circuit 3 described in Embodiment 1.

The column store search process program is a program to realize the processes conducted by the column store search circuit 3 of Embodiment 1. The configuration of the flash storage 2 is the same as that of Embodiment 1 except that the column store search circuit 3 of Embodiment 1 is replaced with a memory. The not-shown memory may be the same storage device as the data buffer 106.

The column store search processing program includes a column decompression program, a data search program, a search result aggregation program, a data projection program, and a projection result formatting program.

The process content of the column store search process program is shown in FIG. 17. After receiving a search request from the computer 1, the control CPU 105 loads the column store search process program into the memory, and executes the program.

First, in Step S1, the control CPU 105 obtains the first search condition and the second search condition from the received search request. The control CPU 105 stores the first search condition into the comparison value table set in the memory. The comparison value table is similar to the table of Embodiment 1 shown in FIG. 7. The control CPU 105 stores the second search condition into the logical condition table set in the memory. The logical condition table is similar to the table of Embodiment 1 shown in FIG. 10.

Next, in Step S2, the control CPU 105 sends a command to the flash controller 107 to read out data corresponding to the data area included in the search request. The flash controller 107 reads out the data of the column store DB 4, and stores the page data 206 in the data buffer 106. After the data is read out from the column store DB 4, the control CPU 105 reads out the page data 206 from the data buffer 106.

In Step S3, the control CPU 105 conducts the column decompression process on the read out page data 206 in a manner similar to the column decompression circuit 109 of Embodiment 1 to store the column data 209 from the compressed page data 206. This process corresponds to the column decompression program described above.

The control CPU 105 also calculates the row number 207 from the row start number 401 of the page data 206 to the end of the page data 206 depending on the number of the compression code. In Embodiment 1, the row number 207 was assigned to the column data 209 after the first search condition and the column data 209 were compared, but in Embodiment 2, a pair of the row number 207 and the representative value is output for each column as the column data 209. The control CPU 105 can store the output column data 209 in the data buffer 106.

In the column decompression process, the control CPU 105 obtains the representative value 1 (402) to representative value m (405) from the page data 206, and writes into the representative value buffer on the memory the representative values and the values of compression codes in which those representative values represent the column data.

The control CPU 105 then successively searches for the representative values from the compression code 406 at the top of the page data 206 to the compression code 409 at the end, and outputs the column data 209 for each column. The control CPU 105 can store the restored column data 209 in the data buffer 106.

In Step S4, the control CPU 105 reads out the column data 209, and compares the column data 209 with the comparison value and comparison condition for each column, which are set in the comparison value table based on the first search condition, for each column from the first row to the last row. This comparison process is conducted in a manner similar to the data search circuit 110 of Embodiment 1. This process corresponds to the data search program described above. The control CPU 105 outputs the column comparison result 503 in which the value indicating the comparison result between the column data 209 and the first search condition is added to each row.

In Step S5, the control CPU 105 stores the column comparison result 503 in the search result intermediate buffer set on the memory. In the search result intermediate buffer, the column comparison result 503 is stored successively from the first row number 207 to the last row number 207 of the page data 206 for each column.

In Step S6, the control CPU 105 conducts the logical calculation on the column comparison result 503 read out from the search result intermediate buffer, based on the second search condition of the logical condition table set in Step S1. This process is conducted in a manner similar to the search result aggregation circuit 112 of Embodiment 1, and corresponds to the process of the search result aggregation program. In this Step S6, the control CPU 105 conducts logical calculation on the column comparison result 503 in the row direction based on the second search condition that specifies the search condition for the respective columns.

A logical calculation condition for the values in the column comparison result 503 is set in the logical condition table in the row direction of the page data 206. The control CPU 105 conducts the logical calculation based on a plurality of search conditions in the row direction of the page data 206, thereby performing a more complex search process than the comparison based on the first search condition in Step S4.

The control CPU 105 receives the column comparison result 503, conducts logical calculation based on the second search condition of the logical condition table, and outputs the logical calculation result 805 for each row. The logical calculation result 805 is comprised of a pair of the row number and the second comparison result.

Examples of the second comparison result include 1-bit data such as "1" for the value matching the second search condition, and "0" for the value not matching the second search condition. Another example of the second comparison result is a text, and "hit" for the value matching the second search condition, and "miss" for the value not matching the second search condition. The control CPU 105 writes the logical calculation result 805 in the final search result buffer set in the memory in the row direction (from the first row to the last row of the page data 206).

The final search result buffer stores therein the logical calculation result 805 corresponding to the first row number 207 to the last row number 207 for each row. When the control CPU 105 reads out the logical calculation result 805 from the final search result buffer, the data is read out as the final comparison result 806.

With Steps S1 to S6 described above, the final search result buffer stores therein the logical calculation result 805 (=final comparison result 806), which is comprised of a pair of the row number and the second comparison result, as search results.

Next, in Step S7, the control CPU 105 extracts the column data 209 of the rows that meet the search condition. This process corresponds to the process conducted by the data projection circuit 113 of Embodiment 1 shown in FIG. 12, and this is a process of the data projection program described above.

The control CPU 105 reads out the column data 209 for each column, matches the column data with the final comparison result 806, and selects the data of the rows that meet the second search condition as the selected column data 1104.

In Step S8, the control CPU 105 stores the selected column data 1104 in the projection result intermediate buffer in the memory for each column from the first row number to the last row number 207. The projection result intermediate buffer stores therein only the column data 209 of the rows that meet the second search condition, or the search request.

In Step S9, the control CPU 105 merges the selected column data of the same row in the row direction, among the selected column data 1104 stored in the projection result intermediate buffer. This process is similar to the process conducted by the projection result formatter 115 of Embodiment 1 of FIG. 13, and corresponds to the projection result formatting process described above.

The control CPU 105 reads out the selected column data 1104 stored in the projection result intermediate buffer, and merges the selected column data 1104 of the same row in the row direction. Then the control CPU 105 converts the selected column data 1104 merged for each row to the row-oriented data 1205 shown in FIG. 14 of Embodiment 1, and outputs the data to the data DMA 104.

In Embodiment 2, the column store search program calculates the column comparison result 503 for each column by comparing the column data 209 of each column with at least one first search condition, and calculates the final comparison result 806 by determining whether the column comparison result 503 for each column matches the second search condition or not for each row. Then the column store search program outputs, as the row-oriented data 1205, the rows that match the second search condition in the final comparison result 806.

After the flash controller 107 reads out the target page data 206 of the column store DB 4 from the flash memory 108 into the data buffer 106, the control CPU 105 can conduct a search process corresponding to the search request. With this configuration, in Embodiment 2, it is possible to eliminate the need for random access to the flash memory 108 unlike the conventional example described above during the search process on the column store DB 4 in a manner similar to Embodiment 1 described above.

Thus, with Embodiment 2, it is possible to eliminate random access for the storage device such as the flash memory 108 in performing search on the column store DB 4, and as a result, the efficiency of the search process can be improved in a manner similar to Embodiment 2.

<Conclusion>

This invention is not limited to the embodiments described above, and encompasses various modification examples. For instance, the embodiments are described in detail for easier understanding of this invention, and this invention is not limited to modes that have all of the described components. Some components of one embodiment can be replaced with components of another embodiment, and components of one embodiment may be added to components of another embodiment. In each embodiment, other components may be added to, deleted from, or replace some components of the embodiment, and the addition, deletion, and the replacement may be applied alone or in combination.

Some of all of the components, functions, processing units, and processing means described above may be implemented by hardware by, for example, designing the components, the functions, and the like as an integrated circuit. The components, functions, and the like described above may also be implemented by software by a processor interpreting and executing programs that implement their respective functions. Programs, tables, files, and other types of information for implementing the functions can be put in a memory, in a storage apparatus such as a hard disk, or a solid state drive (SSD), or on a recording medium such as an IC card, an SD card, or a DVD.

The control lines and information lines described are lines that are deemed necessary for the description of this invention, and not all of control lines and information lines of a product are mentioned. In actuality, it can be considered that almost all components are coupled to one another.

<Supplementation>

A data structure of column-oriented database,
wherein the column-oriented database includes at least one page data, and
wherein, in the page data, a first row number included in the page data is set at a prescribed location, and data for each column is stored in a prescribed order in a row direction.

What is claimed is:

1. A storage device that stores therein a column-oriented database, comprising:
a non-volatile semiconductor storage part configured to store the column-oriented database;
a storage controller configured to control data-reading and data-writing of the non-volatile semiconductor storage part;
a search part configured to conduct a search process on the column-oriented database; and
a control processor configured to receive a search request and control the storage controller and the search part,
wherein the control processor requests search target data included in the search request from the storage controller, obtains a first search condition and a second search condition included in the search request, and provides the first and second search conditions to the search part, thereby causing the search part to conduct a search process on the search target data, and
wherein the search part comprises:
a column read-out part configured to read out page data of the column-oriented database to be subjected to a search process, the column-oriented database being read out by the storage controller, obtain a first row number of the page data, and read out column data for each column stored in the page data successively from the first row number to a last row number,
a data search part configured to compare the first search condition with the first row to the last row of the column data read out for each column, and output a comparison result;
a search result aggregation part configured to compare, after a comparison result for each column in an area specified by the search request is output, the comparison result with the second search condition in a row direction, and identify a row that meets the second search condition based on the comparison result; and
a projection result formatting part configured to merge the column data of a row that meets the second search condition extracted in a row direction, thereby converting the column data to row-oriented data, and output the row-oriented data.

2. The storage device according to claim 1,
wherein the search part further comprises:
data projection part configured to receive the column data for each column from the column read-out part successively from the first row to the last row, compare the column data with a determination result of the search result aggregation part, and extract the column data of the row that meets the second search condition.

3. The storage device according to claim 1,
wherein the search part is comprised of hardware.

4. The storage device according to claim 1,
wherein the data search part outputs a comparison result between the column data and the first search condition as one-bit data for each column from the first row to the last row.

5. The storage device according to claim 1,
wherein the control processor instructs the search part to conduct a search process on a plurality of the page data respectively including different first row numbers, and
wherein the search part includes a plurality of the column read-out parts and a plurality of the data search parts, and conducts search processes on the plurality of page data received from the control processor at the same time.

6. The storage device according to claim 2,
wherein the control processor instructs the search part to conduct a search process on a plurality of the page data respectively including different first row numbers, and
wherein the search part includes a plurality of the column read-out parts, a plurality of the data search parts, and a plurality of the data projection parts, and conducts search processes on the plurality of page data received from the control processor at the same time.

7. A computer system, comprising:
a computer configured to manage a column-oriented database; and
a storage device configured to store column-oriented database,
wherein the computer generates a search request for the storage device,
wherein the storage device comprises:
a non-volatile semiconductor storage part configured to store the column-oriented database;
a storage controller configured to control data-reading and data-writing of the non-volatile semiconductor storage part;
a search part configured to conduct a search process on the column-oriented database; and
a control processor configured to receive a search request from the computer and control the storage controller and the search part,
wherein the control processor requests search target data included in the search request from the storage controller, obtains a first search condition and a second search condition included in the search request, and provides the first and second search conditions to the search part, thereby causing the search part to conduct a search process on the search target data, and
wherein the search part comprises:
a column read-out part configured to read out page data of the column-oriented database to be subjected to a search process, the column-oriented database being read out by the storage controller, obtain a first row number of the page data, and reads out column data for each column stored in the page data successively from the first row number to a last row number;
a data search part configured to compare the first search condition with the first row to the last row of the column data read out for each column, and output a comparison result;
a search result aggregation part configured to compare, after a comparison result for each column in an area specified by the search request is output, the comparison result with the second search condition in a row direction, and identify a row that meets the second search condition based on the comparison result; and
a projection result formatting part configured to merge the column data of each row that meets the second search condition extracted in a row direction, thereby converting the column data to row-oriented data, and output the row-oriented data.

8. The computer system according to claim 7,
wherein the search part further comprises:
a data projection part configured to receive the column data for each column from the column read-out part successively from the first row to the last row, compare the column data with a determination result of the search result aggregation part, and extract the column data of each row that meets the second search condition.

9. The computer system according to claim 7,
wherein the search part is comprised of hardware.

10. The computer system according to claim 7,
wherein the data search part outputs a comparison result between the column data and the first search condition as one-bit data for each column from the first row to the last row.

11. The computer system according to claim 7,
wherein the control processor instructs the search part to conduct a search process on a plurality of the page data respectively including different first row numbers, and
wherein the search part includes a plurality of the column read-out parts, and a plurality of the data search parts, and conducts search processes on the plurality of page data received from the control processor at the same time.

12. The computer system according to claim 7,
wherein the control processor instructs the search part to conduct a search process on a plurality of the page data respective including different first row numbers, and
wherein the search part includes a plurality of the column read-out parts, a plurality of the data search parts, and a plurality of data projection parts, and conducts search processes on the plurality of page data received from the control processor at the same time.

13. A control method for a storage device that stores therein a column-oriented database,
wherein the storage device comprises:
a non-volatile semiconductor storage part configured to store the column-oriented database;
a storage controller configured to control data-reading and data-writing of the non-volatile semiconductor storage part;
a search part configured to conduct a search process on the column-oriented database; and
a control processor configured to receive a search request and control the storage controller and the search part, and
wherein the control method comprises:
a first step in which the control processor requests search target data included in the search request from the storage controller, obtains a first search condition and a second search condition included in the search request, and provides the first and second search conditions to the search part, thereby causing the search part to conduct a search process on the search target data;
a second step in which the search part reads out page data of the column-oriented database to be subjected to a search process, the column-oriented database being read out by the storage controller, obtains a first row number of the page data, and reads out column data for each column stored in the page data successively from the first row number to a last row number;
a third step in which the search part compares the first search condition with the first row to the last row of the column data for each column, and outputs a comparison result;
a fourth step in which the search part compares, after a comparison result for each column in an area specified by the search request is output, the comparison result with the second search condition in a row direction, and identifies each row that meets the second search condition based on the comparison result; and
a sixth step in which the search part merges the extracted column data of each row that meets the second search condition in the row direction, thereby converting the column data to row-oriented data, and outputs the row-oriented data.

14. The control method for a storage device according to claim 13, further comprising:
a fifth step in which the search part receives the column data for each column successively from the first row to the last row, compares the column data with a determination result of the forth step, and extracts column data of each row that meets the second search condition.

15. The control method for a storage device according to claim 13,
wherein, in the third step, a comparison result between the column data and the first search condition is output as one-bit data for each column from the first row to the last row.

* * * * *